United States Patent Office 3,442,883
Patented May 6, 1969

3,442,883
PALLADIUM CATALYZED POLYMERIZATION OF ALLENE
George D. Shier, Midland, Mich., assignor to The Dow Chemical Company, Midland, Mich., a corporation of Delaware
No Drawing. Filed Mar. 22, 1967, Ser. No. 625,007
Int. Cl. C08f *3/02;* B01j *11/84*
U.S. Cl. 260—94.3     13 Claims

ABSTRACT OF THE DISCLOSURE

Allene polymerizes in acetic acid containing a palladium II salt and certain trivalent phosphorous or arsenic compounds as a head-to-head polymer characterized by adjacent pendant methylene groups. This polyallene is a reactive dienophile, crosslinking agent and synthetic intermediate.

Background

In U.S. Patent 3,151,104 Robinson describes polymerization of allene with a Ziegler catalyst to give a polymer containing random pendant methylene and vinyl groups. Also a crystalline 1,2-polyallene prepared with a transition metal π-complex catalyst is described by Otsuka e.a., J. Am. Chem. Soc., 87, 3017 (1965).

Summary of the invention

A novel polyallene of the formula:

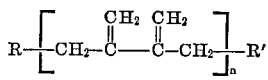  (I)

wherein R and R' are individually —H,

or OH, has been prepared by a sterospecific, head-to-head 1,2-addition polymerization of allene catalyzed by a novel palladium composition. This catalyst consists essentially of an acetic acid solution of a palladium salt $Pd(Y)_{2/m}$ where Y is a weak coordinating anion of valence $m$, and about 0.25–2.0 moles of triarylphosphine or triarylarsine per mole of said palladium salt. Advantageously the catalyst composition also contains a small amount of a strong protonic acid as an acid buffer. Polymerization by reaction of allene and this palladium catalyst occurs at about 0–75° C., preferably about 20–50° C.

Catalyst

This process employs a novel combination of (a) certain palladium II salts and (b) a triarylphosphine or arsine as a cocatalyst in an acetic acid medium. It requires a palladium salt with a weak coordinating anion Y such as acetate, benzoate, perchlorate, nitrate, sulfate, fluoborate, benzenesulfonate, tosylate and hexafluorophosphate. Because of availability, palladium nitrate or acetate is generally preferred. Indeed, it is likely that in the acetic acid medium the active catalyst is an acetate complex formed in situ.

Salts of anions which coordinate strongly with palladium, e.g., chloride, bromide, cyanide, thiocyanate and similar anions with nitrogen, sulfur or halogen donor atoms, are inactive. In fact the system must be kept free of such anions since through preferential coordination of the palladium they deactivate the catalytic process.

Also essential is a triarylphosphine or triarylarsine cocatalyst of the formula:

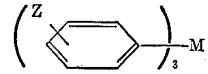

wherein M is P or As and Z is H, $C_1$–$C_4$ alkyl or alkoxyl, Br or Cl. Particularly effective is triphenylphosphine. Other suitable cocatalysts include tri-o-tolylphosphine, tri-p-tolyl-phosphine, tri-o-anisylphosphine, tri-p-anisylphosphine, tri-o-chlorophenylphosphine, tri-p-chlorophenylphosphine, triphenylarsine, tri-o-anisylarsine, tri-o-chlorophenylarsine, and tri-o-tolylarsine.

Optimum yields of polymer are obtained with a mole ratio of palladium and cocatalyst of about 0.7–1.2. With a mole ratio outside about 0.25–2.0, the rate of allene conversion and yield of polymer is low.

Acetic acid is an essential element in the process. Neither formic nor propionic acid are effective as a polymerization medium. The frequent occurrence of a terminal acetoxy group in the polymer is evidence that acetic acid is more than an inert solvent.

Preferably the palladium catalyst is prepared and used as a homogeneous acetic acid solution about 0.1–0.5 M in palladium salt and cocatalyst. If desired a small amount of an antioxidant such as 3,5-dinitrocatechol or 2,6-di-t-butylcresol can be added as a stabilizer. Also it is often advantageous to add to the catalyst ocmposition prior to use, a small but effective amount of a strong protonic acid, such as p-toluenesulfonic acid, benzenesulfonic acid, phosphoric acid, perchloric acid or sulfuric acid to provide an acid buffer for the acetic acid catalyst solution. An acid molarity of 0.005–0.05 M in the catalyst composition is suitable.

Process conditions

Polymerization can be carried out batchwise or continuously by contacting allene with the palladium catalyst in acetic acid at about 0–75° C., preferbaly about 20–50° C., for a time sufficient to yield the allene polymer. Depending particularly on the catalyst concentration and temperature, polymerization may require from several hours to several days.

For a normal batch run, the reactor is charged with sufficient acetic acid and palladium catalyst composition to give after addition of the allene about 1.0–1000 p.p.m. of the palladium salt and about 0.1–10 parts of acetic acid per part of allene. Pure allene is not required since propylene and other simple olefins are essentially inert under normal reaction conditions, a mixture of allene and such olefins can be used. After adding the allene, polymerization is achieved by mixing the reactants at about 0–75° C. Then the solid polymer is recovered from the acetic acid solution by filtration or other suitable means. The acetic acid solution can be recycled or processed to recover the palladium values.

Polyallene (I)

The resulting allene polymer varies in form from a waxy solid, to a soft gel, to a rubbery solid. It is normally light yellow in color, soluble in non-polar organic solvents such as hexane, benzene, toluene, methylene chloride and carbon tetrachloride, but insoluble in water, methanol and similar polar hydroxylic liquids. In air at room temperature it is gradually converted into an insoluble resin. But it can be stored at lower temperatures in the absence of oxygen.

Its structure as identified by its infrared and NMR spectra corresponds to Formula I:

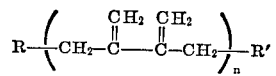  (I)

wherein R and R' individually are —H or

Since terminal acetate groups are readily hydrolyzed to the correspondingly hydroxyl groups, R and R' also can be OH.

Strong confirmation of this structure and the characteristic adjacent pendant methylene groups, is the ease with which it reacts with maleic anhydride to form an essentially equimolar Diels-Alder adduct. Also it copolymerizes readily with styrene to give a highly cross-linked polymer with a low swelling index.

This invention is further illustrated by the following examples. Unless otherwise specified all parts and percentages are by weight.

Example 1.—Pd catalyzed polymerization of allene (A) A stainless steel bomb was charged with 0.1 part (0.4 mmoles) triphenyl phosphine, 0.05 part of 3,5-dinitrocatechol, 2.0 parts of glacial acetic acid, 9.0 parts methanol and a solution of 0.1 part (0.4 mmoles) palladium nitrate dihydrate, 0.015 part of potassium acetate and 1.5 parts of 0.3 M $H_3PO_4$ in acetic acid. The bomb was evacuated, cooled to —78° C. and 12.0 parts allene added. Then the mixture was shaken for 16 hrs at 30° C. After venting 5.0 parts of unreacted allene, the bomb was cooled to —10° C. and the solid light yellow polymer was recovered. It was purified by dissolving in a small amount of methylene chloride, filtering and reprecipitating with cold methanol. After drying 5.1 parts of solid polymer was recovered.

(B) In a duplicate run at 50° C., 10.2 parts of allene was consumed and 7.1 parts of a soluble polymer was recovered. At a temperature above 75° C., the polymer was too unstable and only insoluble tars were recovered.

(C) In another run under similar conditions, a mixture of 12 parts of allene and 12 parts of propylene was shaken with the catalyst solution at 30° C. After about 16 hours, 15.6 parts of unreacted propylene and allene and 4.75 parts of a soluble polyallene were recovered.

The soluble essentially linear polymer obtained in these runs had a molecular weight of about 1,000–5,000. Its infrared and NMR spectra revealed a structure different from previous allene polymers. The infrared spectrum showed strong vinylidene unsaturation but no vinyl groups. The NMR spectrum disclosed two types of olefinic protons, an equal number of olefinic and alkyl protons, and terminal methyl and acetoxy groups. The acetoxy groups were readily hydrolyzed to the corresponding alcohol. When mixed with maleic anhydride in benzene at room temperature, a solid adduct containing about 1 equivalent of maleic anhydride per diene unit of the polymer readily formed. This evidence all supports the structure given by Formula I.

Example 2.—Cocatalysts

Using the general procedure of Example 1, a number of triarylphosphines and triarylarsines were examined as cocatalysts with the results shown in Table 1. The resulting polymers, whether obtained as a gel, rubbery solid, or soluble polymer had essentially the same spectral analyses as the polymer described in Example 1.

TABLE 1.—COCATALYSTS

| Cocatalyst [a] | Reacted [b] Allene, percent | Product |
|---|---|---|
| Tri-o-tolylphosphine | 56 | Gel polymer. |
| Tri-p-tolylphosphine | 40 | Soluble polymer. |
| Tri-o-anisylphosphine | 60 | Rubbery solid. |
| Tri-p-anisylphosphine | 32 | Soluble polymer. |
| Tri-o-chlorophenylphosphine | 53 | Rubbery solid. |
| Tri-p-chlorophenylphosphine | 40 | Soluble polymer. |
| Triphenylarsine | 21 | Do. |
| Tri-o-anisylarsine | 62 | Do. |
| Tri-o-chlorophenylarsine | 56 | Do. |
| Tri-o-tolylarsine | 75 | Gel polymer. |

[a] 1 mole per mole Pd II.
[b] 16 hrs. at 30° C.

Example 3.—Cocatalyst ratio

Using the general procedure of Example 1 with 0.2 part palladium nitrate dihydrate, 15 parts acetic acid and 12 parts allene, the effect of triphenylphosphine concentration was examined in a polymerization for 16 hrs. at 40° C. Results are shown in Table 2.

TABLE 2.—COCATALYST RATIO

| Parts $\phi_3P$ | Mole Ratio, $\phi_3P/Pd$ | Reacted Allene,[a] percent | Soluble Polymer,[a] percent |
|---|---|---|---|
| None | | 31 | None |
| 0.05 | 0.19 | 38 | 1.5 |
| 0.10 | 0.38 | 58 | 22 |
| 0.15 | 0.56 | 77 | 53 |
| 0.20 | 0.75 | 91 | 57 |
| 0.25 | 0.95 | 77 | 54 |
| 0.30 | 1.15 | 46 | Gel |
| 0.40 | 1.50 | 35 | 10 |

[a] Based on allene charged.

Example 4.—Acid buffer

The effect of toluenesulfonic acid as an added acid buffer in the catalyst composition was examined in another series of runs carried out as described in Example 1 with the omission of the $H_3PO_4$ and potassium acetate. Typical results are shown in Table 3.

TABLE 3.—TOLUENESULFONIC ACID BUFFER

| Acid Conc. | Reacted Allene,[a] percent | Polymer,[a] percent |
|---|---|---|
| 0 | 37 | 18 |
| 0.01 M | 65 | 48 |
| 0.02 M | 79 | Gel |
| 0.04 M | 67 | Gel |

[a] Based on allene charged.

Example 5.—Diluents

In the process of Example 1, methanol is used as a diluent to maintain the fluidity of the reactant mixture at low temperatures. However, acetic acid can be used alone as a solvent, or a wide variety of other non-halogen containing liquids can be used as a diluent with the acetic acid. Typical results using the procedure of Example 1 with an equal volume of acetic acid and methanol or another liquid diluent are given in Table 4.

TABLE 4.—LIQUID DILUENTS

| Diluent | Reacted Allene,[a] percent | Polymer,[a] percent |
|---|---|---|
| Methanol | 50 | 37 |
| Water | 20 | 10 |
| Nitromethane | 76 | 38 |
| 3-methyltetrahydrothiophene-1,1-dioxide | 72 | 52 |
| Benzonitrile | 29 | 18 |

[a] 16 hrs. at 40° C.

Particularly suitable as a diluent are $C_1$–$C_3$ alcohols used in a ratio of about 0.5–10 parts per part of acetic acid as shown in Table 5.

TABLE 5.—DILUENT RATIO [a]

| Parts HOAc | Parts MeOH | Reacted Allene,[b] percent | Polymer,[b] percent |
|---|---|---|---|
| 7.5 | 6.0 | 59 | 40 |
| 5.5 | 7.6 | 58 | 42 |
| 3.5 | 9.2 | 53 | 46 |
| 2.0 | 10.4 | 57 | 43 |

[a] 12 parts allene, 40° C., 16 hrs.
[b] Based on allene charged.

I claim:
1. An allene polymer of the formula:

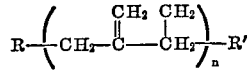

wherein R and R' individually are —H,

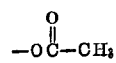

or —OH and $n$ is the average number of 2,3-dimethylenetetramethylene groups.

2. The allene polymer of claim 1 further characterized as a solid polymer soluble in methylene chloride at 25° C. with an average molecular weight of about 1000–5000.

3. A process for preparing an allene polymer which comprises contacting allene with an acetic acid solution of
(a) a palladium salt of the formula $Pd(Y)_{2/m}$ wherein Y is a weak coordinating anion of valence $m$, and
(b) about 0.25–2.0 moles of a triarylphosphine or triarylarsine per mole of said palladium salt, for a time sufficient to yield an allene polymer.

4. The process of claim 3 wherein the palladium salt is selected from the group consisting of palladium acetate, benzoate, nitrate, perchlorate, sulfate, fluoroborate, benzenesulfonate, tosylate and hexafluorophosphate.

5. The process of claim 3 wherein the triarylphosphine or triarylarsine has the formula:

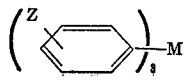

wherein M is P or As and Z is H, $C_1$–$C_4$ alkyl or alkoxyl, Br or Cl.

6. The process of claim 3 wherein the triarylphosphine is triphenylphosphine.

7. The process of claim 3 wherein the acetic acid solution contains an effective amount of a strong protonic acid buffer.

8. The process of claim 7 wherein the protonic acid is toluenesulfonic acid.

9. The process of claim 7 wherein the protonic acid is phophoric acid.

10. The process of claim 3 wherein the acetic acid solution is diluted with 0.5–10 parts of $C_1$–$C_3$ alcohol per part of acetic acid.

11. The process of claim 3 wherein allene is contacted with an acetic acid solution containing 1–1000 p.p.m. of palladium nitrate, about 0.7–1.2 moles of triphenylphosphine per mole of palladuim nitrate, and about 0.005–0.05 M of a strong protonic acid, at 0–75° C. for a time sufficient to yield a solid allene polymer having an average molecular weight of about 1000–5000.

12. A palladium catalyst composition consisting essentially of an acetic acid solution of
(a) a palladium salt of the formula $Pd(Y)_{2/m}$ wherein Y is a weak coordinating anion of valence $m$, and
(b) about 0.25–2.0 moles of a triarylphosphine or triarylarsine per mole of said palladium salt.

13. The palladium catalyst composition of claim 12 wherein the palladium salt is palladium nitrate or acetatae and the cocatalyst is triphenylphosphine.

References Cited

UNITED STATES PATENTS

| 3,318,891 | 5/1967 | Hausman et al. | 260—270 |
| 3,151,104 | 9/1964 | Robinson. | |
| 3,262,969 | 7/1966 | Clark et al. | |

OTHER REFERENCES

Otsuka et al.: J. Am. Chem. Soc. 87, 3017 (1965).

JOSEPH L. SCHOFER, *Primary Examiner.*

RICHARD A. GAITHER, *Assistant Examiner.*

U.S. Cl. X.R.

252—431, 437

PO-1050
(5/69)

UNITED STATES PATENT OFFICE
CERTIFICATE OF CORRECTION

Patent No. 3,442,883      Dated May 6, 1969

Inventor(s) George D. Shier

It is certified that error appears in the above-identified patent and that said Letters Patent are hereby corrected as shown below:

The formula in Claim 1 should be the same as the formula in Column 1, lines 32-35.

SIGNED AND
SEALED
DEC 23 1969

(SEAL)
Attest:

Edward M. Fletcher, Jr.
Attesting Officer

WILLIAM E. SCHUYLER, JR.
Commissioner of Patents